(12) United States Patent
Tanaka et al.

(10) Patent No.: US 7,445,820 B2
(45) Date of Patent: Nov. 4, 2008

(54) OPTICAL FILMS COMPRISING A UV-CURABLE ALIGNMENT FILM AND A LIQUID CRYSTAL COMPOUND

(75) Inventors: Kouichi Tanaka, Kita-ku (JP); Syoushi Takahashi, Kita-ku (JP); Kenichiro Yoshioka, Kita-ku (JP)

(73) Assignees: Nippon Kayaku Kabushiki Kaisha, Tokyo (JP); Polatechno Co., Ltd., Tokyo (JP)

( * ) Notice: Subject to any disclaimer, the term of this patent is extended or adjusted under 35 U.S.C. 154(b) by 0 days.

(21) Appl. No.: 11/219,010

(22) Filed: Sep. 2, 2005

(65) Prior Publication Data
US 2006/0008663 A1    Jan. 12, 2006

Related U.S. Application Data

(62) Division of application No. 10/468,243, filed as application No. PCT/JP02/01608 on Feb. 22, 2002.

(30) Foreign Application Priority Data

| Feb. 23, 2001 | (JP) | ............................... 2001-47575 |
| Feb. 26, 2001 | (JP) | ............................... 2001-49696 |
| Apr. 23, 2001 | (JP) | ............................... 2001-123871 |
| Apr. 23, 2001 | (JP) | ............................... 2001-123931 |

(51) Int. Cl.
*C08K 19/00*   (2006.01)

(52) U.S. Cl. ........................ 428/1.2; 428/1.5; 428/1.55; 428/1.6

(58) Field of Classification Search .................. 428/1.1, 428/1.2, 1.3, 1.33, 1.5, 1.53
See application file for complete search history.

(56) References Cited

U.S. PATENT DOCUMENTS

| 5,499,128 A | 3/1996 | Hasegawa et al. ............. 359/81 |
| 5,583,679 A | 12/1996 | Ito et al. ..................... 349/118 |
| 5,631,051 A | 5/1997 | Ito ................................. 428/1 |

(Continued)

FOREIGN PATENT DOCUMENTS

EP    0 565 044    10/1993

(Continued)

OTHER PUBLICATIONS

The European communication dated Apr. 18, 2006.

(Continued)

*Primary Examiner*—Kevin R. Kruer
(74) *Attorney, Agent, or Firm*—Nields & Lemack

(57) ABSTRACT

There is provided an optical film obtained by laminating a polarizing film protective layer and a retardation film comprising a liquid crystalline compound layer, a retardation film protective layer and a polymer film, wherein the retardation film protective layer comprising a cured product of a UV-curable resin composition is inserted between the polymer film and the liquid crystalline compound layer to control or block the migration to the liquid crystalline compound layer of a material present in the polymer film and affecting the optical properties of the liquid crystalline compound layer by migrating to the liquid crystalline compound layer, in such a manner that the protective layer side of the polarizing film and the liquid crystalline compound layer side of the retardation film are opposed to each other.

5 Claims, 1 Drawing Sheet

U.S. PATENT DOCUMENTS

| | | | |
|---|---|---|---|
| 5,820,783 A | 10/1998 | Siemensmeyer et al. | 252/299.61 |
| 5,833,880 A | 11/1998 | Siemensmeyer et al. | 252/299.64 |
| 6,013,339 A | 1/2000 | Yamada et al. | 428/1.53 |
| 6,224,788 B1 | 5/2001 | Ogawa et al. | 252/299.4 |
| 6,704,082 B2 | 3/2004 | Tomioka et al. | 349/123 |
| 2001/0050741 A1 | 12/2001 | Hokazono et al. | 349/137 |

FOREIGN PATENT DOCUMENTS

| | | | |
|---|---|---|---|
| EP | 0 666 290 | | 9/1995 |
| EP | 0 867 469 | | 9/1998 |
| EP | 0911656 | * | 4/1999 |
| JP | 60188926 | * | 9/1985 |
| JP | 5-95034 | | 4/1993 |
| JP | 8-50204 | | 2/1996 |
| JP | 8-50206 | | 2/1996 |
| JP | 8-50270 | | 2/1996 |
| JP | 8-95030 | | 4/1996 |
| JP | 8-338913 | | 12/1996 |
| JP | 2001-48904 | | 2/2001 |
| JP | 2001-54936 | | 2/2001 |
| KR | 2000-0021807 | | 4/2000 |
| KR | 10-0277768 | | 1/2001 |

OTHER PUBLICATIONS

The International Search Report dated May 20, 2002.
English translation of the Taiwanese Communication dated Mar. 15, 2004.
Chinese Communication dated May 13, 2005, with English translation.
European communication dated Jan. 25, 2007.
European communication dated Feb. 25, 2008.
European communication dated Feb. 29, 2008.

* cited by examiner

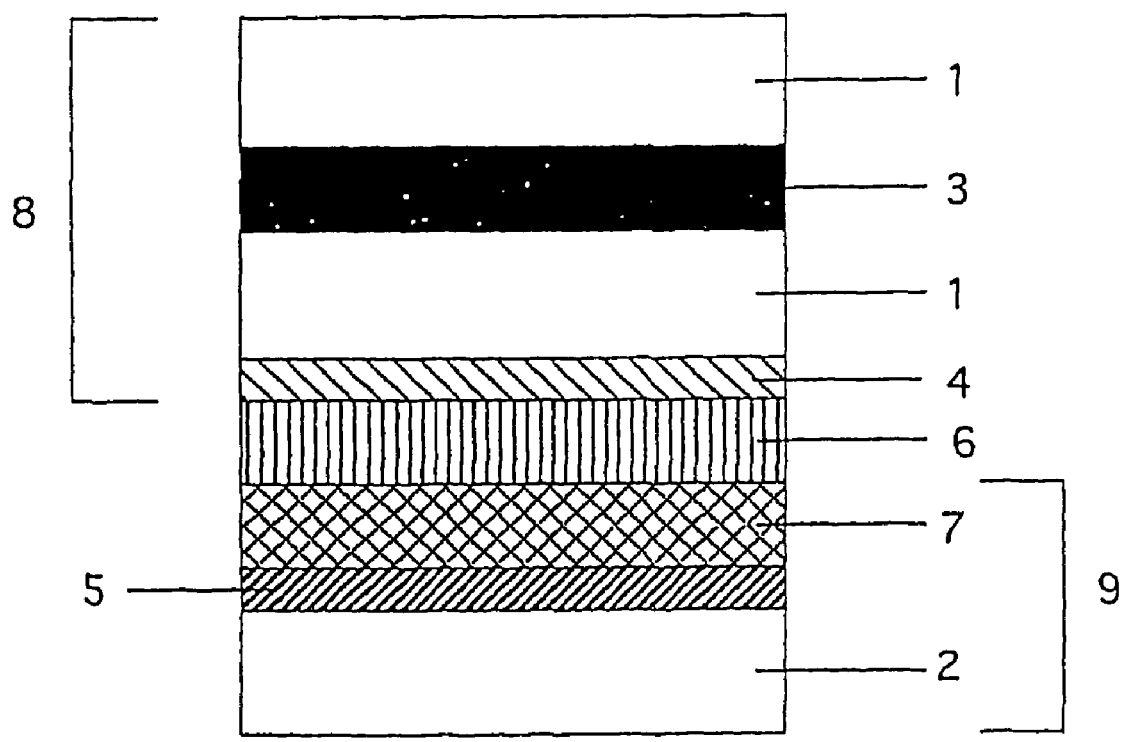

OPTICAL FILMS COMPRISING A UV-CURABLE ALIGNMENT FILM AND A LIQUID CRYSTAL COMPOUND

This application is a Divisional of U.S. Ser. No. 10/468,243 filed Nov. 24, 2003, which is a 371 of PCT/JP2002/01608 filed Feb. 22, 2002, the disclosures of which are incorporated herein by reference.

TECHNICAL FIELD

The present invention relates to retardation films comprising a polymer film having an alignment film used to align a liquid crystalline compound and a liquid crystalline compound layer.

BACKGROUND ART

Liquid crystalline compounds can exhibit optical anisotropy by changing the aligned state in a fixed direction by external stimulation. Liquid crystal displays used for display screens in personal computers or portable phones are prepared on the basis of this property. Known methods for aligning liquid crystalline compounds in a fixed direction include rubbing the surface of the substrate with a cloth such as nylon or rayon. However, liquid crystalline compounds are not always aligned by rubbing any substrate, but they are normally aligned by rubbing a layer called alignment film on the substrate. Films with stabilized optical anisotropy thus obtained by aligning a liquid crystalline compound in a fixed direction are attracting attention as very useful films for improving various optical properties of liquid crystal displays. For example, films having hybrid aligned discotic liquid crystals on a polymer film such as a triacetyl cellulose film can improve viewing angle characteristics of TN-type liquid crystal displays. Films having horizontally aligned nematic liquid crystals on a triacetyl cellulose film have similar properties to those of uniaxially oriented polycarbonate retardation films and can improve the contrast of STN-type liquid crystal displays. Some of such films having an aligned liquid crystalline compound layer on a polymer film have special performance that cannot be obtained with conventional retardation films prepared by uniaxially or biaxially orienting a polymer film. Such films having an aligned liquid crystalline compound layer on a polymer film can be obtained by e.g. directly rubbing the polymer film or forming a suitable alignment film and rubbing its surface, then forming a layer of a liquid crystalline compound, turning the liquid crystalline compound in a specific aligned state and then stabilizing the aligned state.

Materials commonly used for alignment films include polyimide compounds. In order to form a polyimide into an alignment film, e.g. a polyamic acid compound as a precursor thereof is dissolved in a solvent and applied on a substrate, and then imidated by heat treatment at a high temperature to form an alignment film consisting of a polyimide compound layer. This imidation is normally performed at a high temperature of 250° C. or more so that normal polymer films cannot be used as substrates in view of heat resistance. Recently, a solution to this problem has been proposed by using solvent-soluble polyimide compounds, but solvents in which polyimide compounds are soluble are limited and they may dissolve or swell the surfaces of polymer films if they are used as substrates so that the surface properties may be seriously damaged to affect the alignment of the subsequent liquid crystalline compound. Otherwise, when a retardation film comprising a polymer film having a liquid crystalline compound layer is prepared by applying a solution of a liquid crystalline compound on a rubbed alignment film of a solvent-soluble polyimide compound, the rubbing effect will be lost and the liquid crystalline compound will not be aligned if the solvent is the same as used to dissolve the polyimide compound. Thus, it would be highly desirable to provide an alignment film that can be used even on less heat- and solvent-resistant polymer films.

Polymer films contain unreacted monomers and materials such as antistatic agents, UV absorbers, leveling agents, adhesion improvers, antiblocking agents, plasticizers for conferring formability or flexibility on the films, etc. However, some kinds of these materials may migrate to the surfaces of the films with time. This phenomenon is accelerated especially in high-temperature and high-humidity atmospheres. When a retardation film having a layer of a certain type of aligned liquid crystalline compound formed on a polymer film is used, therefore, these materials may migrate to the liquid crystalline compound layer to cause change in retardation value or insufficient alignment or otherwise affect the optical properties of the aligned liquid crystalline compound. Such a problem is especially significant when a retardation film having a liquid crystalline compound layer is prepared using a triacetyl cellulose film containing a phthalic acid ester such as triphenyl phosphate (hereinafter referred to as TPP), biphenyl diphenyl phosphate or ethyl phthalyl ethyl glycolate as a plasticizer.

DISCLOSURE OF THE INVENTION

As a result of careful studies to solve the problems described above, we newly found that a liquid crystalline compound can be aligned even on a less heat- and solvent-resistant polymer film, when using a UV-curable resin composition for alignment film comprising at least one (meth)acrylate compound having one or more polar groups and one or more (meth)acryloyl groups in the molecule and a photoinitiator and by applying this composition on the polymer film and then curing it with UV rays to form an alignment film, followed by rubbing to align the liquid crystalline compound formed on the rubbed surface. We also found that problems with the migration of plasticizers or the like can be solved by inserting a protective layer for controlling or blocking the migration of these materials to the liquid crystalline compound layer between the polymer film and the liquid crystalline compound layer to improve changes in the optical properties of the liquid crystalline compound layer due to the migration of plasticizers or the like. Finally, we solved problems with both alignment film and protective layer at the same time by combining their functions. Accordingly, the present invention relates to:

(1) a UV-curable resin composition for alignment film comprising at least one (meth)acrylate compound having one or more polar groups and one or more (meth)acryloyl groups in the molecule and a photoinitiator;

(2) the UV-curable resin composition for alignment film as defined in (1) above wherein the polar group is any one of hydroxyl, ether, amino and urethane groups and an isocyanurate ring;

(3) the UV-curable resin composition for alignment film as defined in (1) or (2) above containing at least two of a (meth)acrylate compound having one or more polar groups and one (meth)acryloyl group in the molecule, a (meth)acrylate compound having one or more polar groups and two (meth)acryloyl groups in the molecule, and a (meth)acrylate compound having one or more polar groups and three or more (meth)acryloyl groups in the molecule;

(4) the UV-curable resin composition for alignment film as defined in any one of (1) to (3) above characterized in that it contains a leveling agent in an amount of 0.0001 part by weight or more and 0.005 parts by weight or less in 100 parts by weight of the UV-curable resin composition;

(5) an alignment film comprising a cured film of a layer of a UV-curable resin composition as defined in any one of (1) to (4) above obtained by forming the layer of the UV-curable resin composition on a substrate and curing it with UV rays;

(6) the alignment film as defined in (5) above wherein the unreacted (meth)acrylate compound content is 0 part by weight or more and 1 part by weight or less in 100 parts by weight of the resin composition after UV curing;

(7) the alignment film as defined in (5) or (6) above wherein the change in haze on the surface of the alignment film formed on the substrate is 0.5% or more and 70% or less before and after an abrasion test using a Taber abrasion tester with abrader wheels for 100 revolutions under a load of 500 g;

(8) the alignment film comprising a cured film of a layer of a UV-curable resin composition as defined in any one of (5) to (7) above exhibiting the function of aligning a liquid crystalline compound layer formed on the surface of the alignment film by rubbing the surface of the alignment film;

(9) a polymer film having an alignment film as defined in any one of (5) to (8) above wherein the substrate is a polymer film;

(10) the polymer film having an alignment film as defined in (9) above wherein the polymer film is based on a cellulose derivative;

(11) the polymer film having an alignment film as defined in (10) above wherein the cellulose derivative is triacetyl cellulose;

(12) a retardation film comprising a liquid crystalline compound layer on the alignment film on a polymer film as defined in any one of (9) to (11) above;

(13) a retardation film comprising a liquid crystalline compound layer, a protective layer and a polymer film characterized in that the protective layer is inserted between the polymer film and the liquid crystalline compound layer to control or block the migration to the liquid crystalline compound layer of a material present in the polymer film and affecting the optical properties of the liquid crystalline compound layer by migrating to the liquid crystalline compound layer;

(14) the retardation film as defined in (13) above wherein the material present in the polymer film and affecting the optical properties of the liquid crystalline compound layer by migrating to the liquid crystalline compound layer is a plasticizer;

(15) the retardation film as defined in (13) or (14) above characterized in that the protective layer comprises a cured product of a UV-curable resin composition;

(16) the retardation film as defined in any one of (13) to (15) above wherein the protective layer is an alignment film as defined in any one of (5) to (8) above;

(17) the retardation film as defined in any one of (13) to (16) above characterized in that the protective layer is capable of aligning the liquid crystalline compound by rubbing;

(18) the retardation film as defined in (16) or (17) above wherein the change in haze on the surface of the protective layer is 4% or more and 70% or less before and after an abrasion test using a Taber abrasion tester with abrader wheels for 100 revolutions under a load of 500 g;

(19) the retardation film as defined in any one of (15) to (18) above characterized in that the UV-curable resin composition used for the protective layer contains a (meth)acrylate compound comprising the reaction product of bisphenol A or a derivative thereof with (meth)acrylic acid;

(20) the retardation film as defined in any one of (13) to (19) above characterized in that it has an alignment film for aligning the liquid crystalline compound on the protective layer;

(21) the retardation film as defined in (20) above wherein the alignment film on the protective layer is an alignment film as defined in any one of (5) to (8) above;

(22) the retardation film as defined in any one of (13) to (21) above wherein the polymer film is based on a cellulose derivative and further contains a plasticizer;

(23) the retardation film as defined in (22) above wherein the cellulose derivative is triacetyl cellulose;

(24) a process for preparing a retardation film comprising applying a protective layer as defined in any one of (13) to (19) above on a polymer film and overlaying a liquid crystalline compound layer thereon;

(25) a process for preparing a retardation film comprising applying a protective layer as defined in any one of (13) to (19) above on a polymer film, overlaying an alignment film as defined in any one of (5) to (8) above thereon, and further overlaying a liquid crystalline compound layer thereon;

(26) a polymer film having a protective layer for use in any one of (13) to (25) above;

(27) a polarizing film having a protective layer for use in any one of (13) to (25) above; and

(28) an optical film obtained by laminating a polarizing film as defined in (27) above and a retardation film as defined in any one of (13) to (22) above in such a manner that the protective layer side of the polarizing film and the liquid crystalline compound layer side of the retardation film are opposed to each other.

BRIEF EXPLANATION OF THE DRAWINGS

FIG. 1 shows an example of an optical film according to the present invention.

EXPLANATION OF THE REFERENCES

1: triacetyl cellulose film saponified on the surface;
2: triacetyl cellulose film;
3: polarizing element;
4: protective layer;
5: protective layer also serving as alignment film;
6: adhesive layer;
7: liquid crystalline compound layer;
8: polarizing film having a protective layer of the present invention;
9: retardation film of the present invention.

DETAILED DESCRIPTION OF THE INVENTION (Meth)acrylate compounds having one or more polar groups and one or more (meth)acryloyl groups in the molecule used in the UV-curable resin compositions for alignment film according to the present invention (hereinafter referred to as compositions for alignment film) include e.g. pentaerythritol tri(meth)acrylate, the reaction product of pentaerythritol tri(meth)acrylate with 1,6-hexamethylene diisocyanate, the reaction product of pentaerythritol tri(meth)acrylate with isophorone diisocyanate, tris(acryloxyethyl) isocyanurate, tris(methacryloxyethyl) isocyanurate, the reaction product of glycerol triglycidyl ether with (meth)acrylic acid, caprolactone-modified tris(acryloxyethyl) isocyanurate, the reaction product of trimethylolpropane triglycidyl ether with (meth)acrylic acid, triglycerol di(meth)acrylate, the reaction product of propylene glycol diglycidyl ether with (meth)acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, the reaction product of 1,6-hexanediol diglycidyl ether with (meth)acrylic acid, 1,6-hexanediol di(meth)acrylate, glycerol di(meth)acrylate, the reaction product of ethylene glycol diglycidyl ether with (meth)acrylic acid, the reaction product of diethylene glycol diglycidyl ether with (meth)acrylic acid, bis(acryloxyethyl) hydroxyethyl isocyanurate, bis(methacryloxyethyl) hydroxyethyl isocyanurate, the reaction product of bisphenol A diglycidyl ether with (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxyethylene glycol (meth)acrylate, methoxyethyl (meth)acrylate, glycidyl (meth)acrylate, glycerol (meth)acrylate, ethyl carbitol meth(acrylate), 2-ethoxyethyl (meth)acrylate, N,N-dimethylaminoethyl (meth)acrylate, 2-cyanoethyl (meth)acrylate, the reaction product of butyl glycidyl ether with (meth)acrylic acid, butoxytriethylene glycol (meth)acrylate, butanediol mono (meth)acrylate, etc. Compositions for alignment film comprising at least one of these (meth)acrylate compounds and a photoinitiator can be cured by UV irradiation to form alignment films.

Among (meth)acrylate compounds having one or more polar groups and one or more (meth)acryloyl groups in the molecule used in the compositions for alignment film of the present invention, those in which the polar group is any one of hydroxyl, ether, amino and urethane groups and an isocyanurate ring are preferred because liquid crystalline compounds formed on the rubbed surfaces of the resulting alignment films are more readily aligned. They may contain another polar group in the molecule. Those (meth)acrylate compounds having a hydroxyl group include e.g. the reaction product of trimethylolpropane triglycidyl ether with acrylic acid (Denacol DA-321 from Nagase & Co., Ltd.), triglycerol diacrylate (Epoxy Ester 80MFA from Kyoeisha Chemical Co., Ltd.), the reaction product of propylene glycol diglycidyl ether with acrylic acid (Denacol DA-911 from Nagase), the reaction product of phthalic acid diglycidyl ether with acrylic acid (Denacol DA-721 from Nagase), pentaerythritol triacrylate (Kayarad PET-30 from Nippon Kayaku Co., Ltd.), the reaction product of 1,6-hexanediol diglycidyl ether with acrylic acid (Kayarad R-167 from Nippon Kayaku), the reaction product of glycerol triglycidyl ether with acrylic acid (Denacol DA-314 from Nagase), glycerol dimethacrylate (Blenmer GMR from NOF CORPORATION), glycerol acrylate methacrylate (Blenmer GAM from NOF), the reaction product of ethylene glycol diglycidyl ether with (meth) acrylic acid (Denacol DM-811 from Nagase), the reaction product of diethylene glycol diglycidyl ether with methacrylic acid (Denacol DM-851 from Nagase), the reaction product of bisphenol A diglycidyl ether with acrylic acid (Kayarad R-115 from Nippon Kayaku), stearate-modified pentaerythritol diacrylate (Aronix M-233 from Toagosei Co., Ltd.), polyethylene glycol/polybutylene glycol methacrylate (Blenmer PET series from NOF), polypropylene glycol methacrylate (Blenmer PP-330, PP-500, PP-800 from NOF), polyethylene glycol methacrylate (Blenmer PE-90, PE-200, PE-350 from NOF), phenoxyhydroxypropyl acrylate (Aronix M-5700 from Toagosei), 2-hydroxypropyl methacrylate (GE-650 from Mitsubishi Gas Chemical Company, Inc.), 2-hydroxypropyl acrylate (HPA from OSAKA ORGANIC CHEMICAL INDUSTRY LTD.), 2-hydroxyethyl methacrylate (GE-610 from Mitsubishi Gas Chemical), 2-hydroxyethyl acrylate (HEA from OSAKA ORGANIC CHEMICAL INDUSTRY), glycerol methacrylate (Blenmer GLM from NOF), the reaction product of butyl glycidyl ether with acrylic acid (Denacol DA-151 from Nagase), butanediol monoacrylate (SR-676 from Sartomer Company), etc.

The (meth)acrylate compounds having an ether group include e.g. tripropylene glycol diacrylate (Kayarad TPGDA from Nippon Kayaku), propylene oxide-modified trimethylolpropane triacrylate (Kayarad TPA-320 and Kayarad TPA-330 both from Nippon Kayaku), triethylene glycol dimethacrylate (SR-205 from Sartomer), triethylene glycol diacrylate (SR-272 from Sartoiner), tetraethylene glycol dimethacrylate (SR-209 from Sartomer), tetraethylene glycol diacrylate (SR-268 from Sartomer), polypropylene glycol diacrylate (NK Ester 9PG from Shin-Nakamura Chemical Co., Ltd.), polypropylene glycol diacrylate (NK Ester APG-400 from Shin-Nakamura Chemical), polyethylene glycol di(meth)acrylate (Kayarad PEG400DA from Nippon Kayaku, NK Ester 23G from Shin-Nakamura Chemical, NK Ester 4G from Shin-Nakamura Chemical, SR-259 from Sartomer, SR-252 from Sartomer, SR-210 from Sartomer, Blenmer PDE-400 from NOF), diethylene glycol di(meth)acrylate (SR-231 from Sartomer, Kayarad DEGDA from Nippon Kayaku), ethylene oxide-modified bisphenol A diacrylate (Kayarad R-551 from Nippon Kayaku), caprolactone-modified tetrahydrofurfuryl acrylate (Kayarad TC series from Nippon Kayaku), tetrahydrofurfuryl acrylate (Kayarad TC-101 from Nippon Kayaku), tetrahydrofurfuryl methacrylate (SR-203 from Sartomer), phenoxy hexaethylene glycol acrylate (NK Ester AMP-60G from Shin-Nakamura Chemical), phenoxy tetraethylene glycol acrylate (Aronix M-102 from Toagosei), phenoxy diethylene glycol acrylate (Kayarad R-564 from Nippon Kayaku), nonylphenoxy polypropylene glycol acrylate (Aronix M-117 from Toagosei), nonylphenoxy polyethylene glycol acrylate (Aronix M-111, M-113 from Toagosei), acryloyl morpholine (Kayarad RM-1001 from Nippon Kayaku), methoxy polypropylene glycol acrylate (DPM-A from Kyoeisha Chemical), methoxy polyethylene glycol methacrylate (Blenmer PME-400 from NOF), methoxy tetraethylene glycol methacrylate (Blenmer PME-200, PME400 from NOF), methoxy triethylene glycol acrylate (MTG-4 from Kyoeisha Chemical), methoxy diethylene glycol methacrylate (Blenmer PME-100 from NOF), 2-methoxyethyl acrylate (SR-244 from Sartomer), glycidyl (meth) acrylate (SR-378, SR-379 from Sartomer), ethyl carbitol acrylate (SR-256 from Sartomer), 2-ethoxyethyl (meth)acrylate (SR-232, SR-233 from Sartomer), etc.

The (meth)acrylate compounds having an amino group include e.g. N,N-dimethylaminoethyl acrylate (SR-363 from Sartomer), N,N-dimethylaminoethyl acrylate (DMA from Sanyo Chemical Industries Ltd.), N,N-diethylaminoethyl acrylate (SR-361 from Sartomer), N,N-diethylaminoethyl methacrylate (DEA from Sanyo Chemical Industries), etc.

The (meth)acrylate compounds having an urethane group include e.g. urethane acrylate compounds comprising the reaction products of a (meth)acrylate compound having a hydroxyl group as mentioned above with a diisocyanate compound such as toluene diisocyanate or 4,4-diphenylmethane diisocyanate or xylylene diisocyanate or 1,6-hexamethylene diisocyanate or isophorone diisocyanate or methylene bis(4-cyclohexyl isocyanate) or trimethylhexamethylene diisocyanate, e.g. the reaction product of pentaerythritol triacrylate with isophorone diisocyanate (Kayarad PET-301 from Nippon Kayaku).

The (meth)acrylate compounds having an isocyanurate ring include e.g. tris(methacryloxyethyl) isocyanurate (SR-290 from Sartomer), caprolactone-modified tris(acryloxyethyl) isocyanurate (Aronix M-325 from Toagosei), tris(acryloxyethyl) isocyanurate (Aronix M-315 from Toagosei), bis(acryloxyethyl) hydroxyethyl isocyanurate (Aronix M-215 from Toagosei), the reaction product of an isocyanate having an isocyanurate ring with pentaerythritol triacrylate (Kayarad TPA-100P from Nippon Kayaku), etc.

Especially preferred compositions for alignment film of the present invention are resin compositions obtained by mixing at least two of a (meth)acrylate compound having one or more polar groups and one (meth)acryloyl group in the molecule, a (meth)acrylate compound having one or more polar groups and two (meth)acryloyl groups in the molecule, and a (meth)acrylate compound having one or more polar groups and three or more (meth)acryloyl groups in the molecule selected from various (meth)acrylate compounds mentioned above because liquid crystalline compounds formed on the rubbed surfaces of the resulting alignment films are further more readily aligned. Such examples include a mixture of the reaction product of an isocyanate having an isocyanurate ring with pentaerythritol triacrylate (Kayarad TPA-100P from Nippon Kayaku) and the reaction product of bisphenol A diglycidyl ether with acrylic acid (Kayarad R-115 from Nippon Kayaku) and tetrahydrofurfuryl acrylate (Kayarad TC-101 from Nippon Kayaku); a mixture of the reaction product of pentaerythritol triacrylate with isophorone diisocyanate (Kayarad PET-301 from Nippon Kayaku) and the reaction product of bisphenol A diglycidyl ether with acrylic acid (Kayarad R-115 from Nippon Kayaku) and tetrahydrofurfuryl acrylate (Kayarad TC-101 from Nippon Kayaku); a mixture of pentaerythritol triacrylate (Kayarad PET-30 from Nippon Kayaku) and tetrahydrofurfuryl acrylate (Kayarad TC-101 from Nippon Kayaku); a mixture of pentaerythritol triacrylate (Kayarad PET-30 from Nippon Kayaku) and the reaction product of 1,6-hexanediol diglycidyl ether with acrylic acid (Kayarad R-167 from Nippon Kayaku) and tetrahydrofurfuryl acrylate (Kayarad TC-101 from Nippon Kayaku); a mixture of pentaerythritol triacrylate (Kayarad PET-30 from Nippon Kayaku) and polyethylene glycol diacrylate (Kayarad PEG400DA from Nippon Kayaku) and tetrahydrofurfuryl acrylate (Kayarad TC-101 from Nippon Kayaku); a mixture of pentaerythritol triacrylate (Kayarad PET-30 from Nippon Kayaku) and the reaction product of bisphenol A diglycidyl ether with acrylic acid (Kayarad R-115 from Nippon Kayaku) and tetrahydrofurfuryl acrylate (Kayarad TC-101 from Nippon Kayaku); a mixture of the reaction product of an isocyanate having an isocyanurate ring with pentaerythritol triacrylate (Kayarad TPA-100P from Nippon Kayaku) and the reaction product of 1,6-hexanediol diglycidyl ether with acrylic acid (Kayarad R-167 from Nippon Kayaku) and tetrahydrofurfuryl acrylate (Kayarad TC-101 from Nippon Kayaku); a mixture of pentaerythritol triacrylate (Kayarad PET-30 from Nippon Kayaku) and the reaction product of 1,6-hexanediol diglycidyl ether with acrylic acid (Kayarad R-167 from Nippon Kayaku) and acryloyl morpholine (Kayarad RM-1001 from Nippon Kayaku); a mixture of pentaerythritol triacrylate (Kayarad PET-30 from Nippon Kayaku) and bis(acryloxyethyl) hydroxyethyl isocyanurate (Aronix M-215 from Toagosei) and tetrahydrofurfuryl acrylate (Kayarad TC-101 from Nippon Kayaku); a mixture of tris(acryloxyethyl) isocyanurate (Aronix M-315 from Toagosei) and tetrahydrofurfuryl acrylate (Kayarad TC-101 from Nippon Kayaku); a mixture of bis(acryloxyethyl) hydroxyethyl isocyanurate (Aronix M-215 from Toagosei) and tetrahydrofurfuryl acrylate (Kayarad TC-101 from Nippon Kayaku); etc.

The compositions for alignment film of the present invention contain a photoinitiator to cure the compositions with UV-rays. Suitable photoinitiators include e.g. acetophenone compounds such as 2-methyl-1-[4-(methylthio)phenyl]-2-morpholinopropane-1 (Irgacure 907 from Ciba Specialty Chemicals), 1-hydroxycyclohexyl phenyl ketone (Irgacure 184 from Ciba Specialty Chemicals), 4-(2-hydroxyethoxy)-phenyl (2-hydroxy-2-propyl) ketone (Irgacure 2959 from Ciba Specialty Chemicals), 1-(4-dodecylphenyl)-2-hydroxy-2-methylpropane-1-one (Darocure 953 from Merck), 1-(4-isopropylphenyl)-2-hydroxy-2-methylpropane-1-one (Darocure 1116 from Merck), 2-hydroxy-2-methyl-1-phenylpropane-1-one (Irgacure 1173 from Ciba Specialty Chemicals) and diethoxyacetophenone; benzoin compounds such as benzoin, benzoin methyl ether, benzoin ethyl ether, benzoin isopropyl ether and benzoin isobutyl ether, 2,2-dimethoxy-2-phenylacetophenone (Irgacure 651 from Ciba Specialty Chemicals); benzophenone compounds such as benzoyl benzoate, methyl benzoyl benzoate, 4-phenylbenzophenone, hydroxybenzophenone, 4-benzoyl-4'-methyl diphenyl sulfide and 3,3'-dimethyl-4-methoxybenzophenone (Kayacure MBP from Nippon Kayaku); and thioxanthone compounds such as thioxanthone, 2-chlorothioxanthone (Kayacure CTX from Nippon Kayaku), 2-methylthioxanthone, 2,4-dimethylthioxanthone (Kayacure RTX), isopropylthioxanthone, 2,4-dichlorothioxanthone (Kayacure CTX from Nippon Kayaku), 2,4-diethylthioxanthone (Kayacure DETX from Nippon Kayaku) and 2,4-diisopropylthioxanthone (Kayacure DITX from Nippon Kayaku). These photoinitiators can be used alone or as a mixture in any ratio.

Benzophenone compounds or thioxanthone compounds may be used in combination with auxiliaries to promote photopolymerization reaction. Such auxiliaries include e.g. amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy) ethyl 4-dimethylaminobenzoate and isoamyl 4-dimethylaminobenzoate.

These photoinitiators and auxiliaries remain as such in alignment films because they are not directly polymerized. Thus, the photoinitiators are preferably added in an amount not influencing the subsequent alignment of liquid crystalline compounds, preferably in the range of 0.5 parts by weight or more and 10 parts by weight or less, more preferably 2 parts by weight or more and 8 parts by weight or less per 100 parts by weight of (meth)acrylate compounds in the compositions for alignment film. Auxiliaries are preferably added in the range of a 0.5 to 2-fold of photoinitiators.

The compositions for alignment film of the present invention may contain other compounds that do not affect the function as the resulting alignment films. Such compounds include (meth)acrylate compounds having one or more (meth)acryloyl groups in the molecule other than the (meth)acrylate compounds mentioned above, or polymer compounds such as polyesters, polyurethanes and polyacrylic acids.

The compositions for alignment film of the present invention thus obtained may be used to prepare alignment films by e.g. applying such a composition on a substrate directly or after it is diluted in a suitable solvent. Then, the solvent is removed by heating or other means followed by UV irradiation to give an alignment film of the present invention. The solvent used for applying the composition is not specifically limited so far as it is excellent in the dissolution of the composition and the wettability on the substrate during coating and does not cause a significant decline in surface properties that affects the alignment of liquid crystalline compounds after coating on the substrate such as a polymer film as described below. Such solvents include, but not limited to, aromatic hydrocarbons such as toluene and xylene; ethers such as anisole, dioxane and tetrahydrofuran; ketones such as methyl isobutyl ketone, methyl ethyl ketone, cyclohexanone, cyclopentanone, 2-pentanone, 3-pentanone, 2-hexanone, 3-hexanone, 2-heptanone, 3-heptanone, 4-heptanone and 2,6-dimethyl-4-heptanone; alcohols such as n-butanol, 2-butanol, cyclohexanol and isopropyl alcohol; cellosolves such as methyl cellosolve and methyl cellosolve acetate; and esters such as ethyl acetate, butyl acetate and methyl lactate. These solvents can be used alone or as a mixture. The concentration of the composition in solution depends on the solubility in the solvent, the wettability on the substrate, the thickness after coating and other factors, but preferably lies in the range of 5-95% by weight, more preferably 10-80% by weight.

When the wettability on the substrate during coating on the substrate is low or when the surface properties of the resulting composition layer are poor, various leveling agents may be added into the composition to improve these properties. Various types of compounds can be used as leveling agents such as silicon, fluorine, polyether, acrylic copolymer and titanate types. These leveling agents are preferably added in an amount that does not affect the wettability of liquid crystalline compounds on the alignment film of the present invention obtained by curing the composition with UV-rays during the step of forming a liquid crystalline compound layer on the alignment film or the alignment of the liquid crystalline compound layer in the range of 0.0001 part by weight or more and 0.005 parts by weight or less in 100 parts by weight of the composition, more preferably 0.0005 parts by weight or more and 0.003 parts by weight or less in 100 parts by weight of the composition.

The method for applying the composition for alignment film of the present invention or a solution thereof on the substrate is not specifically limited, but the surface of the resulting alignment film should preferably be as smooth as possible because the surface properties of the alignment film influence the subsequent alignment of liquid crystalline compounds. Coating methods for obtaining such an alignment film include e.g. spin coating, wire bar coating, gravure coating, calendar coating, spray coating, meniscus coating, etc. The alignment film preferably has a thickness of about 0.001-20 μm, more preferably 0.05-10 μm and such a thickness can be achieved by controlling the concentration of the solution, the coating method and coating conditions.

When the composition for alignment film is cured by UV irradiation in order to obtain an alignment film of the present invention, the composition should preferably be highly polymerized by UV irradiation with minimum unreacted matters to sufficiently obtain the subsequent rubbing effect and to prevent defective alignment of liquid crystalline compounds due to the migration of unreacted (meth)acrylate to the liquid crystalline compound layer. Thus, the unreacted (meth)acrylate compound content is preferably 0 part by weight or more and 1 part by weight or less, more preferably 0 part by weight or more and 0.7 parts by weight or less, still more preferably 0 part by weight or more and 0.5 parts by weight or less in 100 parts by weight of the resin composition after UV curing. Such an alignment film can be obtained by e.g. optimizing the nature or amount of the photoinitiator to be added or applying a sufficient dose of UV-rays or adapting the atmosphere during UV irradiation for curing. The dose of UV-rays depends on the nature of the (meth)acrylate compound in the composition for alignment film of the present invention, the nature and the amount of the photoinitiator and the film thickness, but preferably lies in the range of 100-1000 mJ/cm$^2$. UV irradiation may take place in an atmosphere such as in the air or an inert gas such as nitrogen, but thinner films should preferably be cured by UV irradiation in an inert gas because they are not sufficiently cured due to impaired oxygen permeation.

The alignment film thus obtained by curing the composition for alignment film of the present invention with UV rays exhibits the function of aligning liquid crystalline compounds by an aligning treatment such as rubbing on the surface. Rubbing is accomplished by using a rubbing roller prepared from a metal roller of such as steel or aluminum covered with a velvet-like so-called rubbing cloth of such as nylon, rayon or cotton via a double-faced adhesive tape or the like and moving a substrate in contact with the rubbing roller rotating at a high speed. Conditions for rubbing are appropriately adapted to achieve a desired alignment of the liquid crystalline compound layer depending on various factors such as the ease of aligning the liquid crystalline compound used, the nature of the rubbing cloth used, the diameter of the rubbing roller, the rotation speed of the rubbing roller, the rotation direction with respect to the traveling direction of the substrate, the length along which the substrate is in contact with the rubbing roller, the pressing force of the rubbing roller against the substrate and the traveling speed of the substrate, and optionally the lap angle at the site where the substrate is in contact with the rubbing roller and the tension on the substrate being traveled if the substrate is a polymer film, provided that the surface of the alignment film should have an appropriate hardness to sufficiently obtain the rubbing effect so that the change in haze on the surface of the alignment film formed on the substrate is 0.5% or more and 70% or less, more preferably 1% or more and 50% or less, still more preferably 1% or more and 40% or less before and after an abrasion test using a Taber abrasion tester with CS-10F wheels for 100 revolutions under a load of 500 g. Such an alignment film can be obtained by e.g. selecting the (meth)acrylate compound as described above or adapting the mixing ratio of a mixture of a plurality of (meth)acrylate compounds or optimizing UV irradiation conditions during UV curing or the nature or the amount of the photoinitiator or adapting the thickness of the alignment film or adding a polymer compound having no influence on the alignment of the liquid crystalline compound, etc.

Thus obtained alignment film of the present invention has the advantage that the liquid crystalline compound can be aligned by rubbing even on a less heat-resistant substrate such as a polymer film and it is also excellent in solvent resistance because it is cured with UV-rays. The alignment film of the present invention can be applied on a glass substrate provided with transparent electrodes or the like to prepare a liquid crystal cell or can be used to prepare a retardation film having an aligned liquid crystalline compound layer formed on a polymer film for improving the optical properties of the liquid crystal display. Especially in the latter case when a retardation film of the present invention is to be prepared, an alignment film of the present invention is formed on a polymer film by the procedure described above and then rubbed, for example. Then, a solution containing a liquid crystalline compound is applied by various coating methods in the same manner as in the process of forming an alignment film using a composition for alignment film of the present invention. Then, the liquid crystalline compound is aligned in a fixed direction by drying with heat or other means or drying and then maintaining a temperature region in which it is in a liquid crystal state for a certain period. Then, the aligned state of the liquid crystalline compound is stabilized by UV curing or quenching to form a liquid crystalline compound layer, whereby a retardation film of the present invention can be obtained. By using such a process to prepare a retardation film of the present invention, a liquid crystalline compound layer can be formed via an alignment film of the present invention to give a desired retardation film even if the polymer film is not suitable for directly forming a liquid crystalline compound layer on the surface of the film (e.g. the liquid crystalline compound is not aligned by rubbing or it is poor in the wettability for the liquid crystalline compound or the liquid crystalline compound is not aligned in a desired direction by rubbing). The polymer film preferably has excellent wettability for the composition for alignment film of the present invention and the solution thereof during the step of forming the alignment film as well as adequate smoothness to cause no decline in the optical properties of the resulting retardation film, and more preferably it also has adhesiveness to the alignment film. Such polymer films include e.g. films based on cellulose derivatives such as diacetyl cellulose and triacetyl cellulose; films based on cycloolefin polymers such as norbornene derivatives; films based on polyesters such as polyethylene terephthalate and polyethylene naphthalate; films based on polycarbonates and derivatives thereof; and films based on polyalkylenes such as polypropylene and polyethylene and derivatives thereof. These films may be uniaxially or biaxially oriented. Among these polymer films, those based on cellulose derivatives are preferred because of the high transparency, and especially, triacetyl cellulose is preferably used because of the versatility and easy combination with polarizers.

Suitable liquid crystalline compounds include e.g. polyethers obtained by polymerizing a monomer mixture comprising a monoepoxide compound containing a mesogen group and a compound containing a hydroxyl group described in JPA 2000-512768; UV-curable liquid crystalline acrylate compounds and mixtures thereof described in WO97/44703; acrylate compounds showing discotic liquid crystallinity described in JPA 1997-52962; polyesters, polyimides, polyamides, polycarbonates and polyester-imides showing liquid crystallinity described in Japanese Patent No. 2743117 and JPA 1998-339813; and polymers of liquid crystal oligomers showing a nematic or smectic phase described in JPA 1996-5839. These liquid crystalline compounds are applied by e.g. coating a solution containing a liquid crystalline compound on a rubbed alignment film of the present invention using various coating methods in the same manner as described above for the process of forming an alignment film using a composition for alignment film of the present invention. Then, the liquid crystalline compound is aligned in a fixed direction by drying with heat or other means or drying and then maintaining a temperature region in which it is in a liquid crystal state for a certain period and then, the aligned state of the liquid crystalline compound is stabilized by crosslinking or UV curing in the presence of a photoinitiator or quenching to form a liquid crystalline compound layer. Retardation films of the present invention having such a liquid crystalline compound layer can be used in e.g. a liquid crystal display comprising a polarizing film and a liquid crystal cell to improve the viewing angle characteristics or contrast ratio of the display or to maintain a stable contrast ratio by compensating for changes in retardation with temperature changes in the liquid crystal cell.

The protective layer used in the present invention is inserted between the polymer film and the liquid crystalline compound layer and serves to control or block the migration from the polymer film of unreacted monomers or additives normally contained in the polymer film and affecting the optical properties of the retardation film of the present invention such as antistatic agents, UV absorbers, leveling agents, adhesion improvers, antiblocking agents, plasticizers for conferring formability or flexibility on the films, etc. without jeopardizing the optical properties of the resulting retardation film. The term "control" or "block" specifically means that, after a retardation film of the present invention comprising e.g. a liquid crystalline compound layer on a protective layer on a polymer film containing said additives is left in a dry and hot atmosphere at e.g. 60-150° C. or a wet and hot atmosphere at e.g. 80° C., 90% RH or 60° C., 90% RH preferably for 10-100 hours, more preferably 10-1000 hours, still more preferably for a longer period, the content of the additives migrating into the liquid crystalline compound layer is normally 1.0% or less, more preferably 0.7% or less, still more preferably 0.5% or less. Such a protective layer may be obtained by vapor-depositing a metal oxide on a polymer film or curing a UV-curable resin composition or forming a polymer compound layer, but preferably curing a UV-curable resin composition because the migration of said additives can be more effectively controlled or blocked and the protective layer can be easily formed.

UV-curable resin compositions used for forming the protective layer used in the present invention (hereinafter referred to as resin compositions for protective layer) comprise various (meth)acrylate compounds and photoinitiators. Suitable (meth)acrylate compounds include e.g. trimethylolpropane tri(meth)acrylate, pentaerythritol tri(meth)acrylate, pentaerythritol tetra(meth)acrylate, ditrimethylolpropane tetra(meth)acrylate, dipentaerythritol pentaacrylate, dipentaerythritol hexaacrylate, the reaction product of pentaerythritol tri(meth)acrylate with 1,6-hexamethylene diisocyanate, the reaction product of pentaerythritol tri(meth)acrylate with isophorone diisocyanate, tris(acryloxyethyl) isocyanurate, tris(methacryloxyethyl) isocyanurate, the reaction product of glycerol triglycidyl ether with (meth)acrylic acid, caprolactone-modified tris(acryloxyethyl) isocyanurate, the reaction product of trimethylolpropane triglycidyl ether with (meth)acrylic acid, triglycerol di(meth)acrylate, the reaction product of propylene glycol diglycidyl ether with (meth)acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, the reaction product of 1,6-hexanediol diglycidyl ether with (meth)acrylic acid, 1,6-hexanediol di(meth)acrylate, glycerol di(meth)acrylate, the reaction product of ethylene glycol diglycidyl ether with (meth)acrylic acid, the reaction product of diethylene glycol diglycidyl ether with (meth)acrylic acid, bis(acryloxyethyl) hydroxyethyl isocyanurate, bis(methacryloxyethyl) hydroxyethyl isocyanurate, the reaction product of bisphenol A diglycidyl ether with (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth) acrylate, methoxyethylene glycol (meth)acrylate, methoxyethyl (meth)acrylate, glycidyl (meth)acrylate, glycerol (meth)acrylate, ethyl carbitol meth(acrylate), 2-ethoxyethyl (meth)acrylate, N,N-dimethylaminoethyl (meth)acrylate, 2-cyanoethyl (meth)acrylate, the reaction product of butyl glycidyl ether with (meth)acrylic acid, butoxytriethylene glycol (meth)acrylate, butanediol mono(meth)acrylate, etc., but more preferably the UV-curable resin compositions contain an acrylate compound having two or more (meth)acryloyl groups in the molecule to control the migration of plasticizers. In such compositions, each (meth)acrylate compound is closely polymerized in the protective layer cured with UV rays so that the migration of plasticizers can be effectively controlled. Especially, resin compositions for protective layer of the present invention containing a (meth)acrylate compound comprising the reaction product of bisphenol A or a derivative thereof with (meth)acrylic acid such as the reaction product of bisphenol A with (meth)acrylic acid or the reaction product of bisphenol A diglycidyl ether with (meth)acrylic acid are preferably used because they can control the migration of plasticizers more effectively.

Resin compositions for protective layer of the present invention may contain other compounds unless they affect the function as the resulting protective layer. Such compounds include (meth)acrylate compounds having one or more (meth)acryloyl groups in the molecule other than the (meth)acrylate compounds mentioned above, or polymer compounds such as polyesters, polyurethanes and polyacrylic acids.

The photoinitiators and auxiliaries contained in the resin compositions for protective layer remain as such in the protective layer because they are not directly polymerized. Thus, the photoinitiators are preferably added in an amount not affecting the subsequent alignment or optical properties of the liquid crystalline compound layer, preferably in the same range as described above for the resin compositions for alignment film.

More preferably, the protective layer used in the present invention also serves to align the liquid crystalline compound by rubbing to have the functions of both protective layer and alignment film at the same time. The protective layer also serving as alignment film is not specifically limited so far as it uses the resin compositions for alignment film described above and has the effect of controlling or blocking the migration of a material affecting the optical properties of retardation films of the present invention, but preferably the change in haze on the surface of the protective layer is 4% or more and 70% or less, more preferably 5% or more and 50% or less before and after an abrasion test using a Taber abrasion tester with abrader wheels for 100 revolutions under a load of 500 g in the same manner as described above for the resin compositions for alignment film. By using thus obtained protective layer also serving as alignment film, problems with forming an alignment film on a less heat- and solvent-resistant polymer film and problems with the migration of plasticizers or the like in the polymer film can be solved at the same time.

Thus obtained protective layer or protective layer also serving as alignment film can be prepared by e.g. the same procedure as described above for the process of preparing an alignment film using a resin composition for alignment film. Various leveling agents that can be used here are preferably added in the range that does not influence the subsequent alignment or optical properties of the liquid crystalline compound layer, preferably in the same range as described above for the resin compositions for alignment film. The content of unreacted (meth)acrylates during UV curing also preferably lies in the same range as described above for the resin compositions for alignment film.

When the protective layer of the present invention does not serve as alignment film, an alignment film for aligning the liquid crystalline compound may be formed on the protective layer. The alignment film is preferably formed of a material that can exhibit the function of aligning the liquid crystalline compound used by rubbing or the so-called photoalignment treatment after the alignment film has been formed. Such materials include e.g. solvent-soluble polyimides, cellulose derivatives, polyvinyl alcohol and derivatives thereof, polymers having an azobenzene structure, polymers having a chalconyl or cinnamoyl group, the resin compositions for alignment film mentioned above, etc. These alignment films are formed by applying a solution of these materials in a suitable solvent on the protective layer followed by drying and, if desired, curing/crosslinking. Thus formed alignment film exhibits the function of aligning the liquid crystalline compound layer subsequently formed in a fixed direction.

The polymer film used in the present invention preferably has excellent wettability for the composition for protective layer described above and the solution thereof during the step of forming the protective layer as well as adequate smoothness to cause no decline in the optical properties of the resulting retardation film, and more preferably it also has adhesiveness to the protective layer. Such polymer films include e.g. the polymer films used for preparing an alignment film on a polymer film using the resin compositions for alignment film described above. Among these polymer films, those based on cellulose derivatives such as triacetyl cellulose normally contain plasticizers such as phthalic acid esters including TPP or biphenyl diphenyl phosphate or ethyl phthalyl ethyl glycolate to give formability and flexibility. These plasticizers migrate to the film surface with time especially in high-temperature and high-humidity atmospheres. This phenomenon can be avoided by preliminarily forming a protective layer of the present invention on such a polymer film to control or block the migration of plasticizers added in the polymer film with time (especially in high-temperature and high-humidity atmospheres) so that changes in the optical properties of the resulting retardation film of the present invention such as retardation value and alignment properties can be controlled and stable optical properties can be maintained for a long period.

When the protective layer also serves as alignment film, a retardation film of the present invention comprising a polymer film, a protective layer also serving as alignment film and a liquid crystalline compound layer can be prepared by e.g. forming the protective layer also serving as alignment film on the polymer film by the same procedure as described above for the procedure of forming an alignment film on a polymer film and then rubbing it. Then, a solution containing a liquid crystalline compound is applied using various coating methods in the same manner as described above for the procedure of forming an alignment film using a resin composition for alignment film of the present invention. Then, the liquid crystalline compound is aligned in a fixed direction by drying with heat or other means or drying and then maintaining a temperature region in which it is in a liquid crystal state for a certain period. Then, the aligned state of the liquid crystalline compound is stabilized by UV curing or quenching, whereby a retardation film having a protective layer also serving as alignment film of the present invention can be obtained. When the protective layer does not serve as alignment film, a solution of a precursor of an alignment film is applied on the protective layer by various coating methods in the same manner as described above for the process of forming a protective layer using a resin composition for alignment film of the present invention. Subsequently, a retardation film having a protective layer of the present invention can be obtained by the same procedure as described above. Liquid crystalline compounds used here include e.g. the liquid crystalline compounds mentioned above.

When the retardation film having a protective layer also serving as alignment film or not of the present invention is used as an assembly in which it is bonded to another film with an adhesive or the like, the above materials contained in the second film may migrate to the liquid crystalline compound layer with time via the adhesive. This phenomenon is prominent for plasticizers such as TPP especially in high-temperature and high-humidity atmospheres. Especially when the retardation film having a protective layer also serving as alignment film or not of the present invention is bonded to a polarizing film with an adhesive, the polarizing film is normally sandwiched between protective films such as triacetyl cellulose films saponified on the surfaces to protect the uniaxially oriented polyvinyl alcohol film containing a dichroic dye as a polarizing element. The triacetyl cellulose films saponified on the surfaces also contain TPP as a plasticizer, which migrates to the liquid crystalline layer via the adhesive. To control the migration of the materials present in polymer films such as TPP, a protective layer of the present invention is preferably formed on the protective films such as triacetyl cellulose films used in the polarizing film. By using an optical film of the present invention in which thus obtained polarizing film having a protective layer of the present invention is bonded to a retardation film having a protective layer also serving as alignment film of the present invention in such a manner that the protective layer side of the polarizing film and the liquid crystalline compound layer side of the retardation film are opposed to each other as shown in FIG. 1, changes in the optical properties such as retardation value with time can be more effectively controlled and stable optical properties can be maintained for a long period.

EXAMPLES

The present invention is further illustrated by the following examples and comparative examples.

Example 1

A UV-curable resin composition of the present invention was obtained by stirring 25 parts by weight of Kayarad PET-30 (Nippon Kayaku), 25 parts by weight of Kayarad R-167 (Nippon Kayaku) and 50 parts by weight of Kayarad TC-101 (Nippon Kayaku) with 5 parts by weight of Irgacure 184 (Ciba Specialty Chemicals). Then, this composition was diluted in methyl ethyl ketone to prepare a solution having a solids content of 80% by weight. This solution was applied on a triacetyl cellulose film TD-80 (Fuji Photo Film Co., Ltd.) using a microgravure coater to form an alignment film having a thickness of 5 μm and the solvent was removed by heating, after which the coating was cured by irradiation with a high-pressure mercury lamp (120 W/cm) in the air to give a triacetyl cellulose film having an alignment film of the present invention. The change in haze on the surface of this alignment film was 12.1% as measured with a hazemeter (TC-H3DPK from Tokyo Denshoku Co., Ltd.) before and after an abrasion test using a Taber abrasion tester with CS-10F wheels for 100 revolutions under a load of 500 g. The unreacted monomer content in the triacetyl cellulose film having this alignment film was 0.25 parts by weight per 100 parts by weight of the cured UV-curable resin composition. Then, this film was bonded to a glass plate with an adhesive and rubbed using a rubbing machine from EHC Co., Ltd. (1 cycle with a rubbing roller of 45 mm in diameter at a roller speed of 1500 rpm and a feed rate of 1 m/min.). Then, a solution of 50% by weight of compound No. 20 described in Example 16 of JPA 2000-512768 (a liquid crystalline polyether consisting of a polymer of 2,3-dihydroxypropyl 2-methyl-2-propenoate and 9-oxiranylnonyl 2-methyl-2-propenoate and 4-methoxyphenyl 4-(4-oxiranylbutoxy) benzoate) in methoxybenzene containing 2% by weight of Irgacure 369 and 0.35% by weight of a chiral dopant ZLI4571 was applied by spin-coating on the triacetyl cellulose film having the rubbed alignment film bonded to the glass plate and dried at 40° C. for 30 minutes and then left at 60° C. for 30 minutes to show a single monodomain by observation under polarizing microscopy, demonstrating that the liquid crystalline compound was homogeneously aligned. The assembly was further irradiated with UV rays (80 W/cm) in a nitrogen atmosphere to prepare a retardation film of the present invention.

Example 2

A UV-curable resin composition used for a protective layer of the present invention was obtained by stirring 40 parts by weight of Kayarad PET-30 (Nippon Kayaku), 20 parts by weight of Kayarad R-167 (Nippon Kayaku) and 40 parts by weight of Kayarad TC-101 (Nippon Kayaku) with 5 parts by weight of Irgacure 184 (Ciba Specialty Chemicals). Then, this composition was diluted in methyl ethyl ketone to prepare a solution having a solids content of 80% by weight. This solution was applied on a triacetyl cellulose film TD-80 (Fuji Photo Film) using a microgravure coater to form a protective layer having a thickness of 5 μm and the solvent was removed by heating, after which the coating was cured by irradiation with a high-pressure mercury lamp (120 W/cm) in the air to give a triacetyl cellulose film having a protective layer also serving as alignment film of the present invention. The change in haze on the surface of this protective layer also serving as alignment film was 7.4% as measured with a hazemeter (TC-H3DPK from Tokyo Denshoku) before and after an abrasion test using a Taber abrasion tester with CS-10F wheels for 100 revolutions under a load of 500 g. Then, this film was bonded to a glass plate with an adhesive and rubbed using a rubbing machine from EHC (1 cycle with a rubbing roller of 45 mm in diameter at a roller speed of 1500 rpm and a feed rate of 1 m/min.). Then, a solution of 50% by weight of compound No. 20 described in Example 16 of JPA 2000-512768 (a liquid crystalline polyether consisting of a polymer of 2,3-dihydroxypropyl 2-methyl-2-propenoate and 9-oxiranylnonyl 2-methyl-2-propenoate and 4-methoxyphenyl 4-(4-oxiranylbutoxy) benzoate) in methoxybenzene containing 2% by weight of Irgacure 369 and 0.35% by weight of a chiral dopant ZLI4571 was applied by spin-coating on the triacetyl cellulose film having the rubbed protective layer bonded to the glass plate and dried at 40° C. for 30 minutes and then left at 60° C. for 30 minutes to show a single monodomain by observation under polarizing microscopy, demonstrating that the liquid crystalline compound was homogeneously aligned. The assembly was further irradiated with UV rays (80 W/cm) in a nitrogen atmosphere to prepare a retardation film of the present invention. Then, this film as bonded to the glass plate was placed in a wet and hot atmosphere at 80° C., 90% RH for 100 hours, before and after which the liquid crystalline compound layer was recovered and TPP was extracted from the liquid crystalline compound layer with dichloromethane to determine TPP levels in the liquid crystalline compound layer using a gas chromatograph (HP-5890 from Hewlett-Packard). The results are shown in Table 1.

Example 3

The same procedure as described in Example 2 was performed except that the acrylate compound in the UV-curable resin composition comprises 40 parts by weight of Kayarad PET-30 (Nippon Kayaku), 20 parts by weight of Kayarad R-115 (Nippon Kayaku) and 40 parts by weight of Kayarad TC-101 (Nippon Kayaku). The change in haze on the surface of the protective layer also serving as alignment film formed on the triacetyl cellulose film was 7.4% before and after the abrasion test. The liquid crystalline compound was homogeneously aligned by the same procedure as described in Example 1 or 2, and a retardation film of the present invention was obtained in the same manner as described in Example 2. TPP levels in the liquid crystalline compound layer were determined by the same procedure as described in Example 2. The results are shown in Table 1.

Example 4

The same procedure as described in Example 1 was performed except that the acrylate compound in the UV-curable resin composition comprises 40 parts by weight of Kayarad TPA-100P (Nippon Kayaku), 20 parts by weight of Kayarad R-115 (Nippon Kayaku) and 40 parts by weight of Kayarad TC-101 (Nippon Kayaku). The change in haze on the surface of the alignment film formed on the triacetyl cellulose film was 5.8% before and after the abrasion test. The liquid crystalline compound was homogeneously aligned, and a retardation film of the present invention was obtained in the same manner as described in Example 1.

Example 5

The same procedure as described in Example 1 was performed except that the acrylate compound in the UV-curable resin composition comprises 40 parts by weight of Kayarad PET-30I (Nippon Kayaku), 20 parts by weight of Kayarad R-115 (Nippon Kayaku) and 40 parts by weight of Kayarad TC-101 (Nippon Kayaku). The change in haze on the surface of the alignment film formed on the triacetyl cellulose film was 6.3% before and after the abrasion test. The liquid crystalline compound was homogeneously aligned, and a retardation film of the present invention was obtained in the same manner as described in Example 1.

Example 6

The same procedure as described in Example 2 was performed except that the acrylate compound in the UV-curable resin composition comprises 60 parts by weight of Aronix M-315 (Toagosei), 20 parts by weight of Kayarad R-115 (Nippon Kayaku) and 20 parts by weight of Kayarad RM-1001 (Nippon Kayaku). The change in haze on the surface of the protective layer also serving as alignment film formed on the triacetyl cellulose film was 16.8% before and after the abrasion test. The liquid crystalline compound was homogeneously aligned, and a retardation film of the present invention was obtained in the same manner as described in Example 2. TPP levels in the liquid crystalline compound layer were determined by the same procedure as described in Example 2. The results are shown in Table 1.

Example 7

The same procedure as described in Example 6 was performed except that the photoinitiator was 5 parts by weight of Irgacure 907 (Ciba Specialty Chemicals). The change in haze on the surface of the protective layer also serving as alignment film formed on the triacetyl cellulose film was 20.5% before and after the abrasion test. The liquid crystalline compound was homogeneously aligned, and a retardation film of the present invention was obtained in the same manner as described in Example 6.

Example 8

The same procedure as described in Example 3 was performed except that 0.0025 parts by weight of a leveling agent Megaface F-470 (Dainippon Ink & Chemicals, Incorporated) was added per 100 parts by weight of the UV-curable resin composition of Example 3. The liquid crystalline compound was homogeneously aligned, and a retardation film of the present invention was obtained in the same manner as described in Example 1.

Example 9

The same procedure as described in Example 2 was performed except that the acrylate compound in the UV-curable resin composition comprises 60 parts by weight of Aronix M-315 (Toagosei) and 40 parts by weight of Kayarad TC-101 (Nippon Kayaku). The change in haze on the surface of the protective layer also serving as alignment film formed on the triacetyl cellulose film was 10.7% before and after the abrasion test. The liquid crystalline compound was homogeneously aligned, and a retardation film of the present invention was obtained in the same manner as described in Example 2. TPP levels in the liquid crystalline compound layer were determined by the same procedure as described in Example 2. The results are shown in Table 1.

Example 10

The same procedure as described in Example 2 was performed except that the acrylate compound in the UV-curable resin composition comprises 40 parts by weight of Kayarad PET-30I (Nippon Kayaku), 20 parts by weight of Kayarad R-115 (Nippon Kayaku) and 40 parts by weight of Kayarad TC-101 (Nippon Kayaku). The change in haze on the surface of the protective layer also serving as alignment film formed on the triacetyl cellulose film was 6.3% before and after the abrasion test. The liquid crystalline compound was homogeneously aligned, and a retardation film of the present invention was obtained in the same manner as described in Example 2. TPP levels in the liquid crystalline compound layer were determined by the same procedure as described in Example 2. The results are shown in Table 1.

COMPARATIVE EXAMPLES

Comparative Example 1

The same procedure as described in Example 6 was performed except that 0.3 parts by weight of the leveling agent used in Example 6 was added per 100 parts by weight of the UV-curable resin composition. However, the liquid crystalline compound was not aligned.

Comparative Example 2

A retardation film comprising a liquid crystalline compound layer and a triacetyl cellulose film was prepared by the same procedure as described in Example 1 except that the triacetyl cellulose film TD-80 (Fuji Photo Film) was directly rubbed and then the liquid crystalline compound layer was formed. In this case, the liquid crystalline compound was homogeneously aligned. TPP levels in the liquid crystalline compound layer were determined by the same procedure as described in Example 2. The results are shown in Table 1.

TABLE 1

TPP levels in the liquid crystalline compound layers (% by weight)

| | Testing at 80° C., 90% RH for 100 hours | |
|---|---|---|
| | Before | After |
| Example 2 | 0% | 0.5% |
| Example 3 | 0% | 0.2% |
| Example 6 | 0% | 0.1% |
| Example 9 | 0% | 0.1% |
| Example 10 | 0% | 0.1% |
| Comparative example 2 | 0% | 1.2% |

TPP level (%) = [(Weight of TPP extracted)/(Weight of liquid crystalline compound layer)] × 100

The results of Examples 1-7 and Comparative example 1 show that the alignment films of the present invention obtained with resin compositions for alignment film of the present invention allow liquid crystalline compounds to be aligned by rubbing so that retardation films of the present invention can be obtained. The results of Examples 2, 3, 6, 9, 10 and Comparative example 2 show that TPP migration is greatly controlled in the retardation films having a protective layer also serving as alignment film by forming the protective layers of the present invention as compared with the comparative example.

ADVANTAGES OF THE INVENTION

The present invention provides UV-curable resin compositions for alignment film comprising at least one (meth) acrylate compound having one or more polar groups and one or more (meth)acryloyl groups in the molecule and a photoinitiator as well as alignment films obtained by curing said compositions with UV rays, whereby liquid crystalline compounds can be homogeneously aligned on various substrates, especially on even less heat- and solvent-resistant polymer films by inserting said alignment films and rubbing them. Retardation films of the present invention having a liquid crystalline compound layer prepared using an alignment film of the present invention can be used in various liquid crystal displays to improve the viewing angle characteristics and the contrast ratio of the displays. The present invention also provides retardation films comprising a liquid crystalline compound layer, a protective layer and a polymer film characterized in that the protective layer is inserted between the polymer film and the liquid crystalline compound layer to control or block the migration to the liquid crystalline compound layer of a material present in the polymer film and affecting the optical properties of the liquid crystalline compound layer by migrating to the liquid crystalline compound layer, so that such films can be used to control or block the migration of the material affecting the optical properties of the liquid crystalline compound layer with time especially in high-temperature and high-humidity atmospheres, thus limiting changes in the optical properties of the retardation films of the present invention such as retardation value and maintaining a certain performance for a long period. By further combining the functions of protective layer and alignment film, an alignment film can be formed even on a less heat- and solvent-resistant polymer film containing a material affecting the optical properties of the liquid crystalline compound layer by migrating to the liquid crystalline compound layer and the migration of the material affecting the optical properties of the liquid crystalline compound layer in the resulting retardation film with time can be controlled or blocked, thus limiting changes in the optical properties of the retardation film of the present invention such as retardation value and maintaining a certain performance for a long period.

What is claimed is:

1. An optical film obtained by laminating a polarizing film having a polarizing film protective layer and a retardation film comprising a liquid crystalline compound layer wherein the aligned state of the liquid crystalline compound is stabilized by UV curing, a retardation film protective layer and a polymer film, characterized in that the retardation film protective layer comprising a cured product of a UV-curable resin composition comprising a mixture selected from the group consisting of the following mixtures (a) to (l) and a photoinitiator and which has been rubbed on the liquid crystalline compound layer side thereof is inserted between the polymer film and the liquid crystalline compound layer over the entire area thereof and is in direct contact with the polymer film and the liquid crystalline compound layer to control or block the migration to the liquid crystalline compound layer of a material present in the polymer film and affecting the optical properties of the liquid crystalline compound layer by migrating to the liquid crystalline compound layer, in such a manner that the protective layer side of the polarizing film and the liquid crystalline compound layer side of the retardation film are opposed to each other:

(a) a mixture of the reaction product of an isocyanate having an isocyanate ring with pentaerythritol triacrylate and the reaction product of bisphenol A diglycidyl ether with acrylic acid and tetrahydrofurfuryl acrylate;

(b) a mixture of the reaction product of pentaerythritol triacrylate with isophorone diisocyanate and the reaction product of bisphenol A diglycidyl ether with acrylic acid and tetrahydrofurfuryl acrylate;

(c) a mixture of pentaerythritol triacrylate and tetrahydrofurfuryl acrylate;

(d) a mixture of pentaerythritol triacrylate and the reaction product of 1,6-hexanediol diglycidyl ether with acrylic acid and tetrahydrofurfuryl acrylate;

(e) a mixture of pentaerythritol triacrylate and polyethylene glycol diacrylate and tetrahydrofurfuryl acrylate;

(f) a mixture of pentaerythritol triacrylate and the reaction product of bisphenol A diglycidyl ether with acrylic acid and tetrahydrofurfuryl acrylate;

(g) a mixture of the reaction product of an isocyanate having an isocyanurate ring with pentaerythritol triacrylate and the reaction product of 1,6-hexanediol diglycidyl ether with acrylic acid and tetrahydrofurfuryl acrylate;

(h) a mixture of pentaerythritol triacrylate and the reaction product of 1,6-hexanediol diglycidyl ether with acrylic acid and acryloyl morpholine;

(i) a mixture of pentaerythritol triacrylate and bis (acryloxyethyl) hydroxyethyl isocyanurate and tetrahydrofurfuryl acrylate;

(j) a mixture of tris(acryloxyethyl)isocyanurate and tetrahydrofurfuryl acrylate;

(k) a mixture of bis(acryloxyethyl)hydroxyethyl isocyanurate and tetrahydrofurfuryl acrylate; and (l) a mixture of tris(acryloxyethyl)isocyanurate and the reaction product of bisphenol A diglycidyl ether with acrylic acid and acryloyl morpholine.

2. The optical film as defined in claim 1 wherein the polymer film is based on a cellulose derivative and further contains a plasticizer.

3. The optical film as defined in claim 2 wherein the cellulose derivative is triacetyl cellulose.

4. An alignment film comprising a cured film of a UV-curable resin composition layer containing a mixture of the reaction product of an isocyanate having an isocyanurate ring with pentaerythritol triacrylate and the reaction product of bisphenol A diglycidyl ether with acrylic acid and tetrahydrofurfuryl acrylate; a mixture of the reaction product of pentaerythritol triacrylate with isophorone diisocyanate and the reaction product of bisphenol A diglycidyl ether with acrylic acid and tetrahydrofurfuryl acrylate; a mixture of pentaerythritol triacrylate and tetrahydrofurfuryl acrylate; a mixture of pentaerythritol triacrylate and the reaction product of 1,6-hexanediol diglycidyl ether with acrylic acid and tetrahydrofurfuryl acrylate; a mixture of pentaerythritol triacrylate and polyethylene glycol diacrylate and tetrahydrofurfuryl acrylate; a mixture of pentaerythritol triacrylate and the reaction product of bisphenol A diglycidyl ether with acrylic acid and tetrahydrofurfuryl acrylate; a mixture of the reaction product of an isocyanate having an isocyanurate ring with pentaerythritol triacrylate and the reaction product of 1,6-hexanediol diglycidyl ether with acrylic acid and tetrahydrofurfuryl acrylate; a mixture of pentaerythritol triacrylate and the reaction product of 1,6-hexanediol diglycidyl ether with acrylic acid and acryloyl morpholine; a mixture of pentaerythritol triacrylate and bis(acryloxyethyl) hydroxyethyl isocyanurate and tetrahydrofurfuryl acrylate; a mixture of tris(acryloxyethyl) isocyanurate and tetrahydrofurfuryl acrylate; a mixture of bis(acryloxyethyl)hydroxyethyl isocyanurate and tetrahydrofurfuryl acrylate; or a mixture of tris(acryloxyethyl(isocyanurate and the reaction product of bisphenol A diglycidyl ether with acrylic acid and acryloyl morpholine; obtained by forming the UV-curable resin composition layer on a substrate and curing it with UV rays and exhibiting the function of aligning a liquid crystalline compound layer formed on the surface of the alignment film by rubbing the surface of the alignment film wherein the change in haze on the surface of the alignment film is 0.5% or more and 70% or less before and after an abrasion test using a Taber abrasion tester with abrader wheels for 100 revolutions under a load of 500 g.

5. The alignment film as defined in claim 4 wherein the UV-curable resin composition comprises a mixture of the reaction product of an isocyanate having an isocyanurate ring with pentaerythritol triacrylate and the reaction product of bisphenol A diglycidyl ether with acrylic acid and tetrahydrofurfuryl acrylate; a mixture of the reaction product of pentaerythritol triacrylate with isophorone diisocyanate and the reaction product of bisphenol A diglycidyl ether with acrylic acid and tetrahydrofurfuryl acrylate; a mixture of pentaerythritol triacrylate and tetrahydrofurfuryl acrylate; a mixture of pentaerythritol triacrylate and the reaction product of 1,6-hexanediol diglycidyl ether with acrylic acid and tetrahydrofurfuryl acrylate; a mixture of pentaerythritol triacrylate and polyethylene glycol diacrylate and tetrahydrofurfuryl acrylate; a mixture of pentaerythritol triacrylate and the reaction product of bisphenol A diglycidyl ether with acrylic acid and tetrahydrofurfuryl acrylate; a mixture of the reaction product of an isocyanate having an isocyanurate ring with pentaerythritol triacrylate and the reaction product of 1,6-hexanediol diglycidyl ether with acrylic acid and tetrahydrofurfuryl acrylate; a mixture of pentaerythritol triacrylate and the reaction product of 1,6-hexanediol diglycidyl ether with acrylic acid and acryloyl morpholine; a mixture of pentaerythritol triacrylate and bis(acryloxyethyl) hydroxyethyl isocyanurate and tetrahydrofurfuryl acrylate; a mixture of tris(acryloxyethyl) isocyanurate and tetrahydrofurfuryl acrylate; a mixture of bis(acryloxyethyl)hydroxyethyl isocyanurate and tetrahydrofurfuryl acrylate; or a mixture of tris(acryloxyethyl) isocyanurate and the reaction product of bisphenol A diglycidyl etherwithacrylic acidandacryloylmorpholine; and a photoinitiator and the unreacted (meth)acrylate compound content is 0 parts by weight or more and 1 part by weight or less in 100 parts by weight of the resin composition after UV curing.

\* \* \* \* \*